(12) United States Patent
Yu et al.

(10) Patent No.: US 11,494,916 B2
(45) Date of Patent: Nov. 8, 2022

(54) METHOD FOR SEPARATING IMAGE AND COMPUTER DEVICE

(71) Applicant: BEIJING DAJIA INTERNET INFORMATION TECHNOLOGY CO., LTD., Beijing (CN)

(72) Inventors: Yonghang Yu, Beijing (CN); Congli Song, Beijing (CN)

(73) Assignee: BEIJING DAJIA INTERNET INFORMATION TECHNOLOGY CO., LTD., Beijing (CN)

(*) Notice: Subject to any disclaimer, the term of this patent is extended or adjusted under 35 U.S.C. 154(b) by 22 days.

(21) Appl. No.: 17/132,707

(22) Filed: Dec. 23, 2020

(65) Prior Publication Data
US 2021/0150730 A1   May 20, 2021

Related U.S. Application Data

(63) Continuation of application No. PCT/CN2018/123958, filed on Dec. 26, 2018.

(30) Foreign Application Priority Data

Jun. 25, 2018  (CN) .......................... 201810661125.7

(51) Int. Cl.
*G06T 7/194* (2017.01)
*G06T 7/143* (2017.01)
*G06T 7/70* (2017.01)

(52) U.S. Cl.
CPC .............. *G06T 7/194* (2017.01); *G06T 7/143* (2017.01); *G06T 7/70* (2017.01); *G06T 2207/20076* (2013.01)

(58) Field of Classification Search
CPC ...................... G06T 7/194; G06T 7/143; G06T 2207/200076
See application file for complete search history.

(56) References Cited

U.S. PATENT DOCUMENTS

2006/0045357 A1    3/2006   Schwartz et al.
2011/0293180 A1*  12/2011   Criminisi .................. G06T 7/11
                                                            348/46

FOREIGN PATENT DOCUMENTS

CN          101710418 A       5/2010
CN          104463878 A       3/2015
                (Continued)

OTHER PUBLICATIONS (Bai Xueyu, "Interactive Image Segmentation Based on Real-Time Feedback", Thesis for Master Degree, Shandong University, p. 16 (54)-22 (60), Oct. 15, 2014) (Year: 2014).*

(Continued)

*Primary Examiner* — Myron Wyche
(74) *Attorney, Agent, or Firm* — Knobbe, Martens, Olson & Bear, LLP

(57) ABSTRACT

A method for separating an image can include: acquiring a foreground pixel value and a background pixel value, where the foreground pixel value and the background pixel value are configured to separate a target area from an original image; acquiring a foreground geodesic distance and a background geodesic distance, where the foreground geodesic distance is a distance between a pixel value of each of pixel points and the foreground pixel value in the original image, and the background geodesic distance is a distance between a pixel value of each of the pixel points and the background pixel value; determining a transparency based on the foreground geodesic distance and the background geodesic distance; and separating the target area based on the transparency.

18 Claims, 5 Drawing Sheets

(56) References Cited

FOREIGN PATENT DOCUMENTS

| CN | 104537637 A | 4/2015 |
|---|---|---|
| CN | 106780506 A | 5/2017 |
| CN | 108830866 A | 11/2018 |

OTHER PUBLICATIONS

International search report of PCT application No. PCT/CN2018/123958 dated Apr. 1, 2019.
First office action of Chinese application No. 201810661125.7 dated Mar. 18, 2019.
Second office action of Chinese application No. 201810661125.7 dated Jun. 13, 2019.
Xueyu Bai, Interactive Image Segmentation Based on Real-time Feedback, Information & Technology, China Master's Theses Full-Text Database (monthly journal), No. 10, Oct. 15, 2014 (Oct. 15, 2014), ISSN: 1674-024, pp. 16-35.
Xue Bai, et al; Geodesic Matting: A Framework for Fast Interactive Image and Video Segmentation and Matting, Jan. 3, 2008.

* cited by examiner

METHOD FOR SEPARATING IMAGE AND COMPUTER DEVICE

CROSS-REFERENCE TO RELATED APPLICATIONS

This application is a continuation application of international application No. PCT/CN2018/123958, filed on Dec. 26, 2018, which claims priority to Chinese Patent Application No. 201810661125.7, filed on Jun. 25, 2018, in the China National Intellectual Property Administration, the disclosure of each of which is incorporated herein by reference in its entirety.

TECHNICAL FIELD

Embodiments of the present disclosure relate to the field of image processing, and more particularly relate to a method for separating an image and a computer device.

BACKGROUND

"Image matting", as one of operations frequently performed in image processing, refers to precise extraction of a desired image part from a picture. Image matting is an important basis of subsequent image processing; and a large number of image matting skills are applied in movies and television plays to synthesize fantasy pictures.

SUMMARY

In a first aspect, embodiments of the present disclosure provide a method for separating an image. The method includes:

acquiring a foreground pixel value and a background pixel value, wherein the foreground pixel value and the background pixel value are configured to separate a target area from an original image;

acquiring a foreground geodesic distance and a background geodesic distance, wherein the foreground geodesic distance is a distance between a pixel value of each of pixel points and the foreground pixel value in the original image, and the background geodesic distance is a distance between a pixel value of each of the pixel points and the background pixel value;

determining a transparency based on the foreground geodesic distance and the background geodesic distance; and separating the target area based on the transparency.

In a second aspect, embodiments of the present disclosure further provide a computer device, including a memory storing a computer-readable instruction therein and a processor. The computer-readable instruction, when executed by the processor, enables the processor to perform the following steps:

acquiring a foreground pixel value and a background pixel value, wherein the foreground pixel value and the background pixel value are configured to separate a target area from an original image;

acquiring a foreground geodesic distance and a background geodesic distance, wherein the foreground geodesic distance is a distance between a pixel value of each of pixel points and the foreground pixel value in the original image, and the background geodesic distance is a distance between a pixel value of each of the pixel points and the background pixel value;

determining a transparency based on the foreground geodesic distance and the background geodesic distance; and separating the target area based on the transparency.

In a third aspect, embodiments of the present disclosure further provide a computer-readable storage medium storing an image separation program therein. The image separation program, when run by a processor, enables the processor to perform the following steps:

acquiring a foreground pixel value and a background pixel value, wherein the foreground pixel value and the background pixel value are configured to separate a target area from an original image;

acquiring a foreground geodesic distance and a background geodesic distance, wherein the foreground geodesic distance is a distance between a pixel value of each of pixel points and the foreground pixel value in the original image, and the background geodesic distance is a distance between a pixel value of each of the pixel points and the background pixel value;

determining a transparency based on the foreground geodesic distance and the background geodesic distance; and separating the target area based on the transparency.

BRIEF DESCRIPTION OF THE DRAWINGS

For clearer descriptions of the technical solutions of the embodiments of the present disclosure, the accompanying drawings required to describe the embodiments are briefly described below. Apparently, the accompanying drawings described hereinafter are only some embodiments of the present disclosure. A person skilled in the art may derive other drawings from the accompanying drawings without involving an inventive effort.

DETAILED DESCRIPTION

Figure 1:
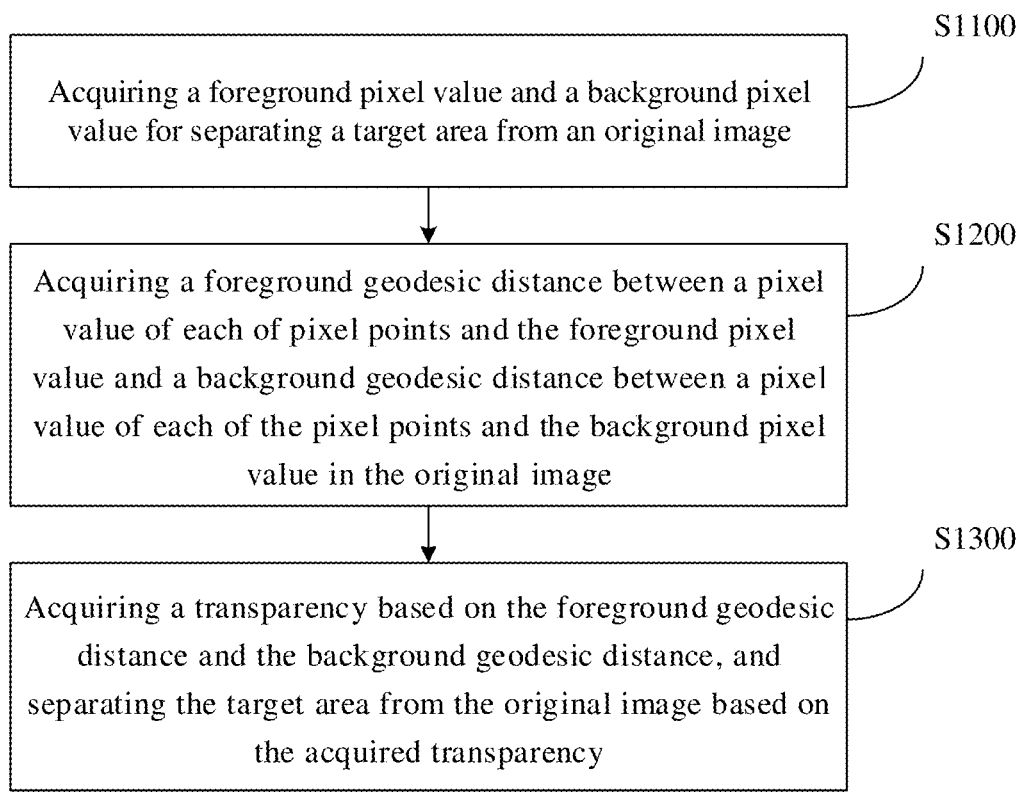
FIG. 1 is a schematic flowchart of a method for separating an image according to an embodiment of the present disclosure.

To enable a person skilled in the art to better understand the solution of the present disclosure, the technical solutions in the embodiments of the present disclosure will be clearly and completely described hereafter in combination with the drawings in the embodiments of the present disclosure.

The flows described in the specification, claims and drawings of the present disclosure include a plurality of operations in a specific order. However, it should be clearly known that the operations can be performed in an order different from the order in the text, or may be performed in parallel, and that the operation numbers, such as 101, 102 and the like, are only used to differentiate different operations, but do not represent any precedence. In some embodiments, the flows include more or fewer operations, and the operations are performed in order or in parallel. It should be noted that the descriptions "first", "second" and the like in the text are used to differentiate different messages, devices, modules and the like, but neither represent a precedence order, nor define that "first" and "second" are different types.

The technical solutions in the embodiments of the present disclosure will be clearly and completely described hereafter in connection with the drawings in the embodiments of the present disclosure. It is apparent that the described embodiments are only a part of the embodiments of the present disclosure, but not the whole. On the basis of the embodiments of the present disclosure, all the other embodiments obtained by a person skilled in the art without involving an inventive effort are concluded in the protection scope of the present disclosure.

A person skilled in the art may understand that the "terminal" or "terminal device" used herein includes a device having a wireless signal receiver having a wireless transmission ability only, and the "terminal" or "terminal device" includes a device having receiving and transmitting hardware capable of carrying out bidirectional communication on a bidirectional communication link. In some embodiments, the "terminal" or "terminal device" includes: a cellular or another communication device provided with a single-line display or a multi-line display or with no multi-line display; a personal communications service (PCS), capable of combining voice, data processing, fax and/or data communication abilities; a personal digital assistant (PDA), including a radio frequency receiver, a pager, an Internet/Intranet access, a web browser, a notebook, a calendar and/or a global positioning system (GPS) receiver; and a conventional laptop and/or palmtop computer or another device. In some embodiments, the computer or another device is provided with a radio frequency receiver. In some embodiments, the "terminal" or "terminal device" used herein is portable, transportable, installed in a vehicle (aviation, sea, and/or land transportation), or adapted to and/or configured to operate locally, and/or operates at any other positions on the earth and/or in a space in a distributed form. Alternatively, the "terminal" or "terminal device" used herein is a communication terminal, an Internet surfing terminal or a music/video playing terminal, for example, a PDA, a mobile Internet device (MID) and/or a mobile telephone having a music/video playing function, or a smart television, a set top box and another device.

Referring to FIG. 1, FIG. 1 is a schematic flowchart of a method for separating an image according to an embodiment of the present disclosure.

As shown in FIG. 1, the method for separating an image is applicable to a computer device and includes the following steps:

In step S1100, a foreground pixel value and a background pixel value for separating a target area from an original image are acquired.

That is, the foreground pixel value and the background pixel value are acquired. The foreground pixel value and the background pixel value are configured to separate the target area from the original image.

During the extraction of the target area, the color of a foreground pixel point in the original image is marked as the foreground pixel value. The color of a background pixel point in the original image is marked as the background pixel value. The target area includes a plurality of foreground pixel points and the target area is a foreground area to be extracted from the original image. A background area includes a plurality of background pixel points and the background area is an area other than the target area in the original image. In some embodiments, a color extraction tool is used to extract a pixel value of the foreground pixel point, and the extracted pixel value is determined to be the foreground pixel value. The color extraction tool is used to extract the color of the background pixel point, and the extracted pixel value is determined to be the background pixel value.

In some embodiments, since the target area and the background area are still not determined during color extraction, a user divides the original image into a sample foreground area and a sample background area to acquire the foreground pixel value and the background pixel value before color extraction. A pixel point in the sample foreground area is a sample foreground pixel point, and a pixel point in the sample background area is a sample background pixel point. The color extraction tool is used to extract a pixel value of the sample foreground pixel point to obtain the foreground pixel value of the sample foreground pixel point. The color extraction tool is used to extract a pixel value of the sample background pixel point to obtain the background pixel value of the sample background pixel point. Subsequently, the method provided in the embodiments of the present disclosure is used for processing to eventually determine a more accurate target area and thus complete the image separation. Alternatively, in other embodiments, the foreground pixel value and the background pixel value may be acquired in another manner. For example, the user manually enters the foreground pixel value and the background pixel value.

The foregoing foreground pixel value acquired in the step S1100 may denote a pixel value of a pixel point in the foreground area, and the background pixel value may denote a pixel value of a pixel point in the background area. When a pixel value of any pixel point in the original image is closer to the foreground pixel value, it is more likely that the pixel point belongs to the target area. When a pixel value of any pixel point in the original image is closer to the background pixel value, it is more likely that the pixel point belongs to the background area.

In step S1200, a foreground geodesic distance between a pixel value of each of pixel points and the foreground pixel value and a background geodesic distance between a pixel value of each of the pixel points and the background pixel value in the original image are acquired.

That is, the foreground geodesic distance and the background geodesic distance are acquired. The foreground geodesic distance is a distance between a pixel value of each of the pixel points and the foreground pixel value in the original image. The background geodesic distance is a distance between a pixel value of each of the pixel points and the background pixel value.

After the foreground pixel value and the background pixel value are acquired, the foreground geodesic distance between the pixel value of each of the pixel points and the foreground pixel value in the original image and the background geodesic distance between the pixel value of each of the pixel points and the background pixel value in the original image are acquired. The foreground geodesic distance is a shortest path between the foreground pixel value in the original image and the background pixel value. The background geodesic distance is a shortest distance between the background pixel value in the original image and the foreground pixel value.

A distance between pixel values of any two pixel points represents a difference between the colors of the two pixel points. When the distance is smaller, it represents that the colors of the two pixel points are closer, and it is more likely that the two pixel points belong to the same area (the target area or the background area). In some embodiments, a distance between pixel values of any two pixel points is an absolute value of a difference between pixel values of the two pixel points. It should be noted that in the embodiments of the present disclosure, the distance between any two pixel points is a distance between pixel values of the two pixel points. The distance may also be referred to as a pixel distance.

In some embodiments, acquiring, by a computer device, the foreground geodesic distance between the pixel value of each of the pixel points and the foreground pixel value and the background geodesic distance between the pixel value of each of the pixel points and the background pixel value in the original image includes:

storing a foreground pixel point in a set; storing a distance between each of the pixel points and the foreground pixel point in the original image in an array, where a distance between a pixel point that is not adjacent to the foreground pixel point and the foreground pixel point is infinity, and a distance between one foreground pixel point and another one is 0; selecting a minimum distance from the array, and adding a pixel point corresponding to the minimum distance to the set; if a distance from the foreground pixel point to another pixel point via the newly added pixel point is less than a distance directly from the foreground pixel point to the another pixel point, replacing the distance corresponding to the another pixel point in the array with the distance from the foreground pixel point to the another pixel point via the newly added pixel point; continuing to select another minimum distance (except the above-mentioned minimum distance) from the array to update a distance of a pixel point corresponding to the newly selected minimum distance in the array until the set includes all pixel points in the original image; and determining the foreground geodesic distance between a pixel value of any pixel point and the foreground pixel value based on a distance corresponding to the any pixel point in the array.

In some embodiments, the foreground geodesic distance between the pixel value of each of the pixel points and the foreground pixel value in the original image is acquired.

Figure 2:
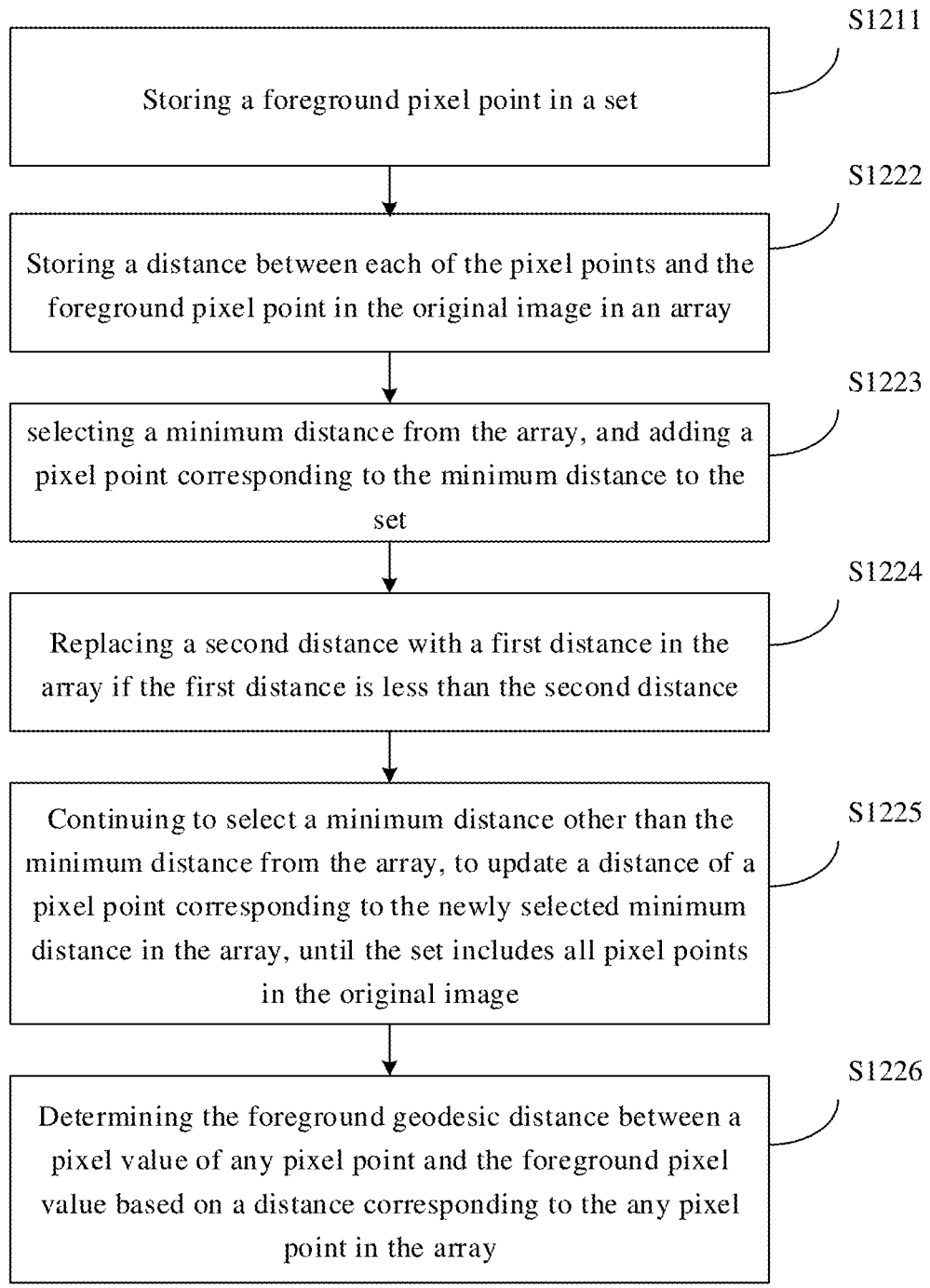
FIG. 2 is a schematic flowchart of acquiring a foreground geodesic distance according to an embodiment of the present disclosure.

In some embodiments, referring to FIG. 2, FIG. 2 is a schematic flowchart of acquiring a foreground geodesic distance according to an embodiment of the present disclosure. As shown in FIG. 2, a method for acquiring a foreground geodesic distance is applicable to a computer device and includes the following steps:

In step S1221, a foreground pixel point is stored in a set.

In step S1222, a distance between each of the pixel points and the foreground pixel point in the original image is stored in an array.

A distance between a pixel point that is not adjacent to the foreground pixel point and the foreground pixel point is infinity, and a distance between one foreground pixel point and another foreground pixel point is 0.

Initially, there is only a foreground pixel point s in the set. A distance corresponding to the foreground pixel point s is assigned as 0 (dis[s]=0). If there exists a pixel point m that the foreground pixel point s can directly reach, a distance dis[m] of the pixel point m is set to w(s, m), and w(s, m) is a distance between a foreground pixel value of the foreground pixel point s and a pixel value of the pixel point m. In addition, a distance of another pixel point (a pixel point that cannot directly reach the foreground pixel point s) is set to infinity. That is, the distance between a pixel value of the another pixel point and the pixel value of the foreground pixel point s is infinity.

When one pixel point can directly reach another pixel point, it means that one pixel point is adjacent to the another pixel point. When one pixel point cannot directly reach another pixel point, it means that two pixel points are not adjacent, and another pixel point is further present between the two pixel points.

That is, after the set is set, the foreground pixel point s is stored in the set. The distance between each of the pixel points and the foreground pixel point in the original image s is acquired. Each of the pixel points in the original image has a distance from the foreground pixel point s. A distance corresponding to each of the pixel points is stored in the array. If a pixel point a is adjacent to the foreground pixel point s, a pixel distance corresponding to the pixel point a is dis[a]=w(s, a), and w(s, a) is a distance between the foreground pixel value of the foreground pixel point s and a pixel value of the pixel point a. If a pixel point b is a foreground pixel point a, a pixel distance corresponding to the pixel point b is dis[b]=0. If a pixel point c is not adjacent to the foreground pixel point s and the pixel point c is not the foreground pixel point s, a pixel distance corresponding to the pixel point c is dis[c]=∞, where ∞ denotes infinity.

In step S1223, a minimum distance is selected from the array, and a pixel point corresponding to the minimum distance is added to the set.

Subsequently, the array and the set continue to be updated. A minimum distance is selected from the array, the minimum distance is a minimum distance between the foreground pixel point s and a nearby pixel point, and a pixel point corresponding to the minimum distance is added to the set.

In step S1224, a second distance is replaced with a first distance in the array if the first distance is less than the second distance.

The first distance is a distance from the foreground pixel point to another pixel point via the newly added pixel point, and the second distance is a distance directly from the foreground pixel point to the another pixel point.

It is determined whether the pixel point newly added in the foregoing step S1223 can reach another pixel point. If the pixel point can reach another pixel point, it is acquired whether the second distance for the foreground pixel point s to reach the another pixel point via the newly added pixel point is less than the first distance for the foreground pixel point s to directly reach the another pixel point and if yes, the second distance corresponding to the another pixel point in the array is replaced with the first distance.

For the foregoing update process in step S1223 and step S1224, distances in the array need to be traversed. First, a minimum distance is determined in the array, and a pixel point m corresponding to the minimum distance is stored in the set. Next, a pixel point n adjacent to the pixel point m is determined in the original image, the foreground pixel point s can reach the pixel point n via the pixel point m, and a distance for the foreground pixel point s to reach the pixel point n via the pixel point m is acquired. The distance is a sum of a distance from the pixel point m to the pixel point n and a distance from the foreground pixel point s to the pixel point m. If the first distance for the foreground pixel point s to reach the pixel point n via the pixel point m is less than the second distance stored in the array for the foreground pixel point s to directly reach the pixel point n, the second distance corresponding to the pixel point n in the array is replaced with the first distance for the foreground pixel point s to reach the pixel point n via the pixel point m.

In step S1225, a minimum distance other than the minimum distance continues to be selected from the array, to update a distance of a pixel point corresponding to the newly selected minimum distance in the array, until the set includes all pixel points in the original image.

After the foregoing steps S1221 to S1224 are performed, all distances in the array continue to be traversed. A minimum distance other than the distance corresponding to the pixel point m is determined in the array, and a pixel point o corresponding to the minimum distance is stored in the set, and the foregoing steps continue to be performed, to update the distance corresponding to the pixel point o in the array. The foregoing steps are repeated, until the set includes all pixel points in the original image, so that the update of the array and the set is completed. In this case, the array includes the minimum distance between each of the pixel points and the foreground pixel point in the original image s, and if there are a plurality of foreground pixel points, minimum distances between each of the pixel points and the plurality of foreground pixel points may be obtained.

In step S1226, a foreground geodesic distance between a pixel value of any pixel point and the foreground pixel value is determined based on a distance corresponding to the any pixel point in the array.

For any pixel point, the minimum distances between the pixel point and the plurality of foreground pixel points are integrated, so that the foreground geodesic distance corresponding to the pixel point may be obtained. Alternatively, if there is only one foreground pixel point, for any pixel point, a minimum distance between the pixel point and the foreground pixel point is determined as the foreground geodesic distance corresponding to the pixel point.

For example, it is determined that the foreground pixel point is C. The original image further includes pixel points A, B1, and B2. A cannot directly reach C, A can directly reach B1 and B2, a distance between A and B1 is 10, and a distance between A and B2 is 30. B1 and B2 can directly reach C, a distance between B1 and C is 25, and a distance between B2 and C is 15. The array includes: dis[A]=∞, dis[B1]=25, and dis[B2]=15. ∞ denotes infinity.

The minimum distance in the array is dis[B2]=15, and B2 is added to the set. B2 can directly reach A, a distance for C to reach A via B2 is 45, and 45 is less than infinity. In this case, the distance is replaced and obtain dis[A]=45. The array includes: dis[A]=45, dis[B1]=25, and dis[B2]=15. The set includes C and B2.

A minimum distance other than dis[B2] in the array is dis[B1]=25, and B1 is added to the set. B1 can directly reach A, a distance for C to reach A via B1 is 35, and 35 is less than 45. In this case, the distance is replaced and obtain dis[A]=35. The array includes: dis[A]=35, dis[B1]=25, and dis[B2]=15. The set includes C, B2, and B1.

A minimum distance other than dis[B2] and dis[B1] in the array is dis[A]=35, and A is added to the set. B1 and B2 both directly reach A, a distance for C to reach B1 via A is 60, 60 is greater than 25, a distance for C to reach B2 via A is 50, and 50 is greater than 15. Therefore, the distance does not need to be replaced. The array includes: dis[A]=35, dis[B1]=25, and dis[B2]=15. The set includes C, B2, B1, and A.

The background pixel point is used as a start point, the background geodesic distance between a pixel value of each of the pixel points and the background pixel value may be acquired.

In step S1300, a transparency is acquired based on the foreground geodesic distance and the background geodesic distance, and the target area is separated from the original image based on the acquired transparency.

After the foreground geodesic distance and the background geodesic distance of any pixel value are acquired, the transparency of the pixel value, that is, the transparency of the pixel point corresponding to the pixel value, is acquired by using the foreground geodesic distance and the background geodesic distance, such that the target area is separated based on the transparency.

The foregoing steps are repeated for each of the pixel points in the original image, so that the transparency of each of the pixel points in the original image may be acquired, and thus to determine whether each of the pixel points is a foreground pixel point or a background pixel point according to the transparency of each of the pixel points and the foreground pixel point may be extracted to form the target area.

In some embodiments, an Alpha channel is an eight-bit gray scale channel. The channel uses 256 gray scales to record a transparency of an image, and defines pixel points in the image as transparent pixel points, non-transparent pixel points, and translucent pixel points based on different transparencies. An area formed by the transparent pixel points is defined as a transparent area. An area formed by the non-transparent pixel points is defined as a non-transparent area. An area formed by the translucent pixel points is defined as a translucent area. The non-transparent area is determined to be the target area in the original image, and thus the target area is separated from the original image based on the transparency.

In some embodiments, the computer device generates a transparency image based on a transparency of each of the pixel points in the original image. Pixel points in the transparency image correspond to pixel points in the original image one by one. The transparency image includes a transparency of each of the pixel points in the original image. A white area in the transparency image denotes that a corresponding area in the original image is a non-transparent area. A black area in the transparency image denotes that a corresponding area in the original image is a transparent area. A gray area in the transparency image denotes that a corresponding area in the original image is a translucent area. Therefore, the white area in the transparency image denotes that a corresponding area in the original image is the target area.

In some embodiments, an alpha value refers to a transparency, and an alpha value is in a range from 0 to 1. A comparison threshold is set and the alpha value is compared with the comparison threshold to determine whether the pixel point corresponding to the alpha value is a transparent pixel point, a non-transparent pixel point or a translucent pixel point. For example, the comparison threshold is set to 0.8, but is not limited thereto. According to different application scenarios, the comparison threshold is any value between 0 and 1. When the comparison threshold is larger, it represents that the color difference value in the target area is smaller, and when the comparison threshold is smaller, it represents that the color difference value in the target area is larger.

In some embodiments, the transparency is acquired by using the following formula:

$$alpha = DF*DF/(DB*DB+DF*DF);$$

where alpha denotes the transparency, the transparency is used for denoting whether a corresponding pixel point belongs to the target area, DF denotes the foreground geodesic distance, and DB denotes the background geodesic distance.

In the foregoing embodiment, a transparency of a pixel point at an edge position in a target area can be determined, so that a contour of the target area is more accurate, and therefore the contour of the extracted target area can be natural without stiffness.

The foreground geodesic distance is a shortest spatial distance between a pixel value of a pixel point in the original image and the foreground pixel value. The background geodesic distance is a shortest spatial distance between a pixel value of a pixel point in the original image and the background pixel value. In some embodiments, referring to FIG. 3, FIG. 3 is a schematic flowchart of acquiring a foreground geodesic distance and a background geodesic distance according to an embodiment of the present disclosure.

Figure 3:
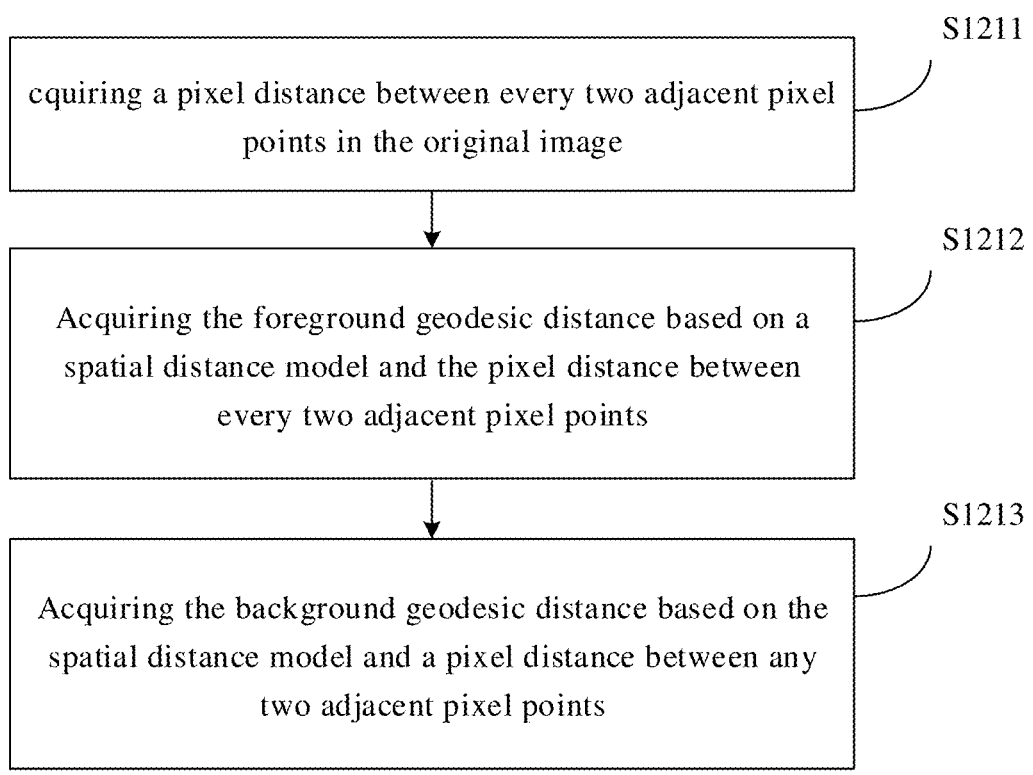
FIG. 3 is a schematic flowchart of acquiring a foreground geodesic distance and a background geodesic distance according to an embodiment of the present disclosure.

As shown in FIG. 3, a method for acquiring a foreground geodesic distance and a background geodesic distance is applicable to a computer device. Step S1200 includes the following steps:

In step S1211, a pixel distance between every two adjacent pixel points in the original image is acquired.

Before the foreground geodesic distance and the background geodesic distance are acquired, a pixel distance between any pixel point in the original image and an adjacent pixel point is first acquired. For example, in a single-color channel, a pixel value of a pixel point is 60. The pixel point is adjacent to three pixel points. Pixel values of the three pixel points are respectively 0, 50, and 150. Pixel distances between the pixel point and the adjacent pixel points are the absolute values of pixel difference values from the adjacent pixel points, that is, 60, 10, and 90 respectively. In some embodiments, when a plurality of channels are used for an image, a pixel distance in every channel is respectively acquired, and a method for acquiring a spatial pixel distance is then equivalent to a method for acquiring a spatial distance between two points in a space.

In step S1212, the foreground geodesic distance is acquired based on a spatial distance model and the pixel distance between every two adjacent pixel points.

After a pixel distance between any two adjacent pixels in the original image is acquired, the foreground geodesic distance between the pixel value of each of the pixel points and the foreground pixel value in the original image is acquired with the Dijkstra algorithm. Breadth-first search is used in the Dijkstra algorithm to solve the single-source shortest path problem of a weighted directed graph or a weighted undirected graph. A shortest path tree is eventually obtained by using the algorithm. A shortest path from a point to another point in the image is determined. The shortest path is a path with a minimum sum of weights of a side that the path has passed.

For example, it is set that a pixel value in the original image represents a start point A, it is set that a pixel point represented by the foreground pixel value is an end point C, and the start point A cannot directly reach the end point C. A pixel distance between the start point A and the end point C is ∞. The start point A can indirectly reach the end point C via a point B1, B2 or B3. A pixel distance between A and B1 is 10. A pixel distance between A and B2 is 30. A pixel distance between A and B3 is 50. A pixel distance between B1 and C is 25. A pixel distance between B2 and C is 15. A pixel distance between B3 and C is 35. In this case, a shortest path between A and C is from A to B1 and from B1 to C (A-B1-C). A pixel distance corresponding to the shortest path is 35.

In some embodiments, the spatial distance model is built according to the Dijkstra algorithm, so that the spatial distance model can implement the processing of the pixel distance between every two adjacent pixel points according to the Dijkstra algorithm, to acquire the foreground geodesic distance.

In step S1213, the background geodesic distance is acquired based on the spatial distance model and a pixel distance between any two adjacent pixel points.

After the pixel distance between any two adjacent pixels in the original image is acquired, the background geodesic distance between the pixel value of each of the pixel points and the background pixel value in the original image is acquired with the Dijkstra algorithm. Breadth-first search is used in the Dijkstra algorithm to solve the single-source shortest path problem of a weighted directed graph or a weighted undirected graph. The shortest path tree is eventually obtained by using the algorithm. The shortest path from a point to another point in the image is determined. The shortest path is a path with a minimum sum of weights of the side that the path has passed.

For example, it is set that a pixel value in the original image represents a start point A, it is set that a pixel point represented by the background pixel value is an end point C, and the start point A cannot directly reach the end point C. A pixel distance between the start point A and the end point C is ∞. The start point A can indirectly reach the end point C via the point B1, B2 or B3. A pixel distance between A and B1 is 30. A pixel distance between A and B2 is 50. A pixel distance between A and B3 is 20. A pixel distance between B1 and C is 35. A pixel distance between B2 and C is 55. A pixel distance between B3 and C is 5. In this case, a shortest path between A and C is from A to B3 and from B3 to C (A-B3-C). A pixel distance corresponding to the shortest path is 25.

In some embodiments, the spatial distance model is built according to the Dijkstra algorithm, so that the spatial distance model can implement the processing of the pixel distance between every two adjacent pixel points according to the Dijkstra algorithm, to acquire the background geodesic distance. In some embodiments, the spatial distance model and the spatial distance model in step S1212 are the same model.

Step S1212 and step S1213 are not subject to a defined precedence relationship. In some embodiments, step S1213 may be performed before step S1212.

Figure 4:
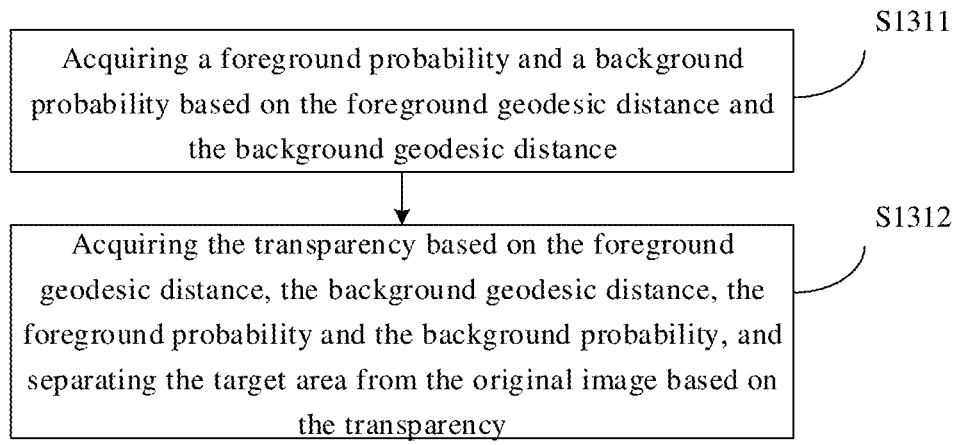
FIG. 4 is a schematic flowchart of acquiring a transparency according to an embodiment of the present disclosure.

In some embodiments, the transparency may be derived based on the foreground geodesic distance, the background geodesic distance, a foreground probability and a background probability. In some embodiments, referring to FIG. 4, FIG. 4 is a schematic flowchart of acquiring a transparency according to an embodiment of the present disclosure. A method for acquiring a transparency is applicable to a computer device. As shown in FIG. 4, step S1300 further includes the following steps:

In step S1311, a foreground probability and a background probability are acquired based on the foreground geodesic distance and the background geodesic distance.

After the foreground geodesic distance and the background geodesic distance of the pixel point in the original image are acquired, the foreground probability and the background probability of the pixel point are acquired based on the foreground geodesic distance and the background geodesic distance. The foreground probability is the probability that the pixel point belongs to the target area, and the background probability is the probability that the pixel point belongs to the background area. In some embodiments, the target area may be separated and extracted after the foreground probability and the background probability of each of the pixel points in the original image are acquired. However, because the target area is extracted in a probability determination manner, the transition between edges of the target area is not smooth, resulting in unnatural visual experience. Therefore, the transparency of each of the pixel points further needs to be acquired.

In some embodiments, the background probability is acquired by using the following formula:

$$PB=DF/(DF+DB);$$

where PB denotes the background probability, the background probability is used for representing a probability that the pixel point does not belong to the target area, DF denotes the foreground geodesic distance, and DB denotes the background geodesic distance.

In some embodiments, the foreground probability is acquired by using the following formula:

$$PF=DB/(DF+DB);$$

where PF denotes the foreground probability, the foreground probability is used for representing a probability that the pixel point belongs to the target area, DF denotes the foreground geodesic distance, and DB denotes the background geodesic distance.

In step S1312, the transparency is acquired based on the foreground geodesic distance, the background geodesic distance, the foreground probability and the background probability, and the target area is separated from the original image based on the transparency.

After the foreground geodesic distance, the background geodesic distance, the foreground probability and the background probability are acquired, alpha is acquired by using the foregoing four parameters.

In some embodiments, the transparency is acquired by using the following formula:

$$\alpha(x)=\omega F(x)/(\omega F(x)+\omega B(x));$$

$$\omega_L(x)=D_L(x)^{-r}*P_L(x), L\in(F,B);$$

where $\alpha(x)$ denotes the transparency, $D_L(x)$ denotes the foreground geodesic distance or the background geodesic distance, $P_L(x)$ denotes the foreground probability or the background probability, F denotes the foreground, B denotes the background, and r is a constant value and is assigned 1 in some embodiments.

$\omega_L(x)$ is substituted in $\alpha(x)$ to obtain: $\alpha(x)=DB^{-r}*PB/(DF^{-r}*PF|DB^{-r}*PB)$, and PB=DF/(DF+DB) and PF=DB/(DF+DB) are substituted in the above formula to obtain: $\alpha(x)=DF*DF/(DB*DB+DF*DF)$. DB denotes the background geodesic distance, and DF denotes the foreground geodesic distance.

Figure 5:
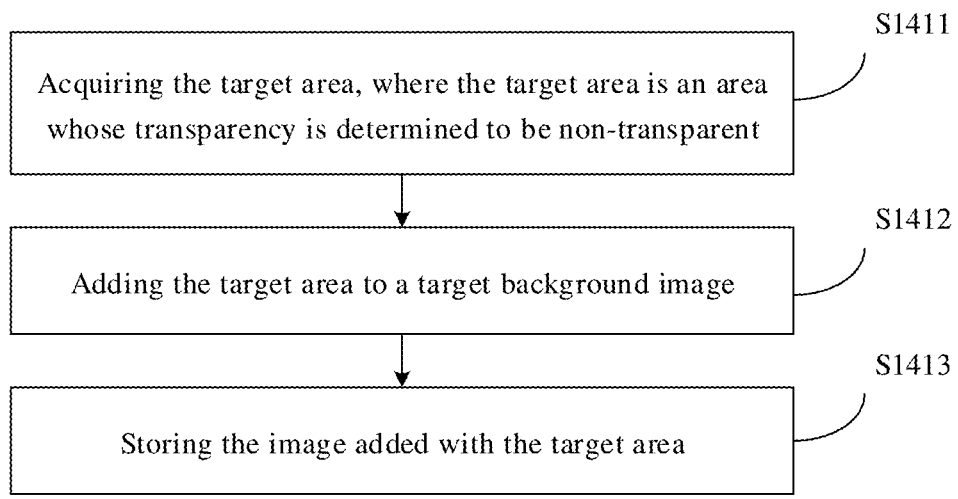
FIG. 5 is a schematic flowchart of replacing a background image according to an embodiment of the present disclosure.

In some embodiments, the target area is extracted to synthesize the target area with the other background images so as to replace a part of content of the background image. Referring to FIG. 5, FIG. 5 is a schematic flowchart of replacing a background image according to an embodiment of the present disclosure. A method for replacing a background image is applicable to a computer device. As shown in FIG. 5, after step S1300, the method further includes the following steps:

In step S1411, the target area is acquired, where the target area is an area whose transparency is determined to be non-transparent.

The target area that is determined to be a non-transparent is extracted from the original image based on the acquired transparency of each of the pixel points in the original image.

In some embodiments, an Alpha channel is an eight-bit gray scale channel. The channel uses 256 gray scales to record a transparency of an image, and defines pixel points in the image as transparent pixel points, non-transparent pixel points, and translucent pixel points based on different transparencies. An area formed by the transparent pixel points is defined as a transparent area. An area formed by the non-transparent pixel points is defined as a non-transparent area. An area formed by the translucent pixel points is defined as a translucent area. The non-transparent area is determined to be the target area in the original image and thus the target area is separated from the original image based on the transparency.

In some embodiments, a transparency image is generated based on a transparency of each of the pixel points in the original image. Pixel points in the transparency image correspond to pixel points in the original image one by one. The transparency image is used for representing the transparency of each of the pixel points in the original image. A white area in the transparency image denotes that a corresponding area in the original image is a non-transparent area. A black area in the transparency image denotes that a corresponding area in the original image is a transparent area. A gray area in the transparency image denotes that a corresponding area in the original image is a translucent area. Therefore, the white area in the transparency image denotes that a corresponding area in the original image is the target area.

In some embodiments, an alpha value refers to a transparency, and an alpha value is in a range from 0 to 1. A comparison threshold is set and the alpha value is compared with the comparison threshold, to determine whether the pixel point corresponding to the alpha value is a transparent pixel point, a non-transparent pixel point or a translucent pixel point. For example, the comparison threshold is set to 0.8, but is not limited thereto. According to different application scenarios, the comparison threshold is any value between 0 and 1. When the comparison threshold is larger, it represents that the color difference value in the target area is smaller, and when the comparison threshold is smaller, it represents that the color difference value in the target area is larger.

The transparency of each of the pixel points in the original image is compared with the set comparison threshold. Pixel points whose transparencies are greater than the comparison threshold are classified into an image area. The image area is the target area.

In step S1412, the target area is added to a target background image.

During the replacement of the background, after the target area is extracted from the original image, the target area is added to a chosen target background image. The target background image is a new background of the determined target area. The target background image is a picture of any type or in any format.

In some embodiments, the target area is copied to the target background image, and subsequently the target area and the target background image further continue to be edited. The editing is, for example, zooming in, zooming out, feathering, color gradation adjustment and the like.

In step S1413, the image added with the target area is stored.

After the target area is copied to the target background image and is further edited, the eventual image is stored so as to complete the background replacement of the target area. In some embodiments, while the image added with the target area is stored, the original image is also stored.

Meanwhile, the original image and the target background image are associated so as to make it convenient for the user to search for an original material. In some embodiments, while the image added with the target area is stored, the target area is separately stored so as to make it convenient for the user to continue to replace the background of the target area as required.

In some embodiments, after the target area in the original image is extracted, the target area is further edited, for example, to be beautified. To protect other background areas other than the target area in the original image, after the target area is determined based on the transparency, an edit instruction only applies in the target area but does not apply in the other background areas. That is, the target area is an editable area, and the other background areas are noneditable areas, so as to achieve the purpose of protecting the background area.

An embodiment of the present disclosure further provides an image separation apparatus.

Figure 6:
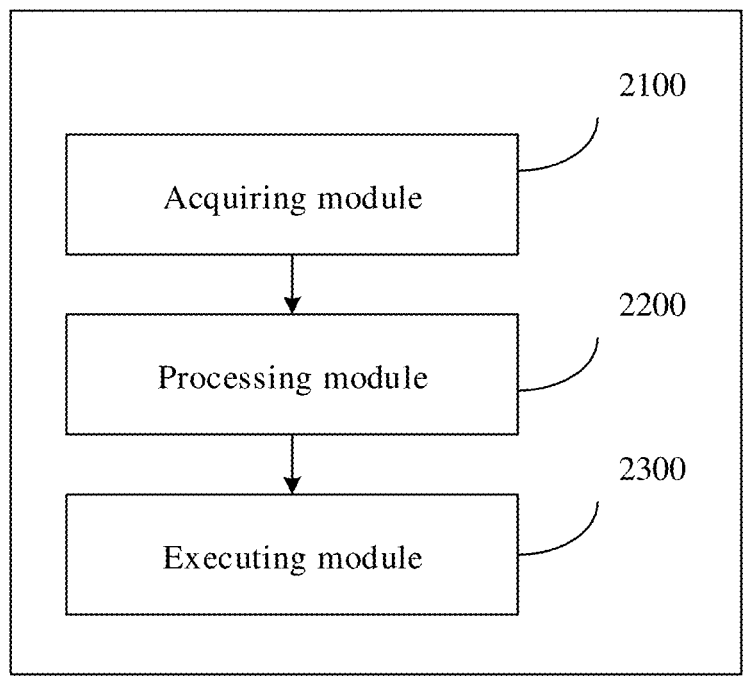
FIG. 6 is a structural block diagram of an image separation apparatus according to an embodiment of the present disclosure.

Referring to FIG. 6, FIG. 6 is a structural block diagram of the image separation apparatus according to an embodiment of the present disclosure.

As shown in FIG. 6, the image separation apparatus includes an acquiring module 2100, a processing module 2200, and an executing module 2300. The acquiring module 2100 is configured to acquire a foreground pixel value and a background pixel value, where the foreground pixel value and the background pixel value are configured to separate a target area from an original image. The processing module 2200 is configured to acquire a foreground geodesic distance and a background geodesic distance are acquired, where the foreground geodesic distance is a distance between a pixel value of each of the pixel points and the foreground pixel value in the original image, and the background geodesic distance is a distance between a pixel value of each of the pixel points and the background pixel value. The executing module 2300 is configured to determine a transparency based on the foreground geodesic distance and the background geodesic distance, and separate the target area based on the transparency.

During image separation by the image separation apparatus, after the foreground pixel value and the background pixel value used for extracting the target area are given, the foreground geodesic distance between the pixel value of the pixel point in the original image and the foreground pixel value and the background geodesic distance between the pixel value of each of the pixel points and the background pixel value are acquired, and the transparency of each of the pixel points is then acquired based on the foreground geodesic distance and the background geodesic distance. A non-transparent area is the target area, that is, an area that needs to be extracted. A transparency is acquired based on a geodesic distance during the extraction of a target area. Therefore, a transparency of a pixel point at any edge position in a target area can be determined, so that the extraction of the contour of the target area is more accurate, and therefore the contour of the extracted target area can be natural without stiffness.

In some embodiments, the image separation apparatus further includes a first acquiring sub-module, a first processing sub-module, and a second processing sub-module. The first acquiring sub-module is configured to acquire a pixel distance between every two adjacent pixel points in the original image. The first processing sub-module is configured to determine the foreground geodesic distance based on the pixel distance between every two adjacent pixel points. The second processing sub-module is configured to determine the background geodesic distance based on the pixel distance between every two adjacent pixel points.

In some embodiments, the image separation apparatus further includes a third processing sub-module and a first executing sub-module. The third processing sub-module is configured to determine a foreground probability and a background probability of a pixel point based on the foreground geodesic distance and the background geodesic distance. The first executing sub-module is configured to determine the transparency based on the foreground geodesic distance, the background geodesic distance, the foreground probability and the background probability, and separate the target area from the original image based on the determined transparency.

In some embodiments, the image separation apparatus further includes a first acquiring sub-module, a fourth processing sub-module, and a second executing sub-module. The first acquiring sub-module is configured to acquire the target area, where the target area is an area whose transparency is determined to be non-transparent. The fourth processing sub-module is configured to add the target area to a target background image. The second executing sub-module is configured to store the image added with the target area.

In some embodiments, the transparency is acquired by using the following formula:

$$alpha = DF*DF/(DB*DB + DF*DF);$$

where alpha denotes the transparency, the transparency is used for denoting whether a corresponding pixel point belongs to the target area, DF denotes the foreground geodesic distance, and DB denotes the background geodesic distance.

In some embodiments, the foreground probability is acquired by using the following formula:

$$PF = DB/(DF + DB);$$

where PF denotes the foreground probability, the foreground probability is used for representing a probability that the pixel point belongs to the target area, DB denotes the foreground geodesic distance, and DF denotes the background geodesic distance.

In some embodiments, the background probability is acquired by using the following formula:

$$PB = DF/(DF + DB);$$

where PB denotes the background probability, the background probability is used for representing a probability that the pixel point does not belong to the target area, DF denotes the foreground geodesic distance, and DB denotes the background geodesic distance.

In some embodiments, the processing module is further configured to:

store a foreground pixel point in a set;

store a distance between each of the pixel points and the foreground pixel point in the original image in an array, where a distance between a pixel point that is not adjacent to the foreground pixel point and the foreground pixel point is infinity, and a distance between one foreground pixel point and another one is 0;

select a minimum distance from the array, and add a pixel point corresponding to the minimum distance to the set;

replace a second distance with a first distance in the array if the first distance is less than the second distance, where the first distance is a distance from the foreground pixel point to another pixel point via the newly added pixel point, and the second distance is a distance directly from the foreground pixel point to the another pixel point;

continue to select a minimum distance other than the minimum distance from the array, to update a distance of a pixel point corresponding to the newly selected minimum distance in the array, until the set includes all pixel points in the original image; and determine the foreground geodesic distance between a pixel value of any pixel point and the foreground pixel value based on a distance corresponding to the any pixel point in the array.

In some embodiments, the executing module is further configured to:

determine foreground pixel points in the pixel points, where the foreground pixel points are pixel points whose transparency is determined to be non-transparent; and separate the target area from the original image, where the target area is an area formed by the foreground pixel points.

In some embodiments, the transparency is acquired by using the following formula:

$$\text{alpha} = DB^{-r} * PB / (DF^{-r} * PF + DB^{-r} * PB);$$

where alpha denotes the transparency, the transparency is used for denoting whether a corresponding pixel point belongs to the target area, DF denotes the foreground geodesic distance, DB denotes the background geodesic distance, PF denotes the foreground probability and the foreground probability represents a probability that the pixel point belongs to the target area, PB denotes the background probability and the background probability is used for representing a probability that the pixel point does not belong to the target area, and r denotes a constant value.

Figure 7:
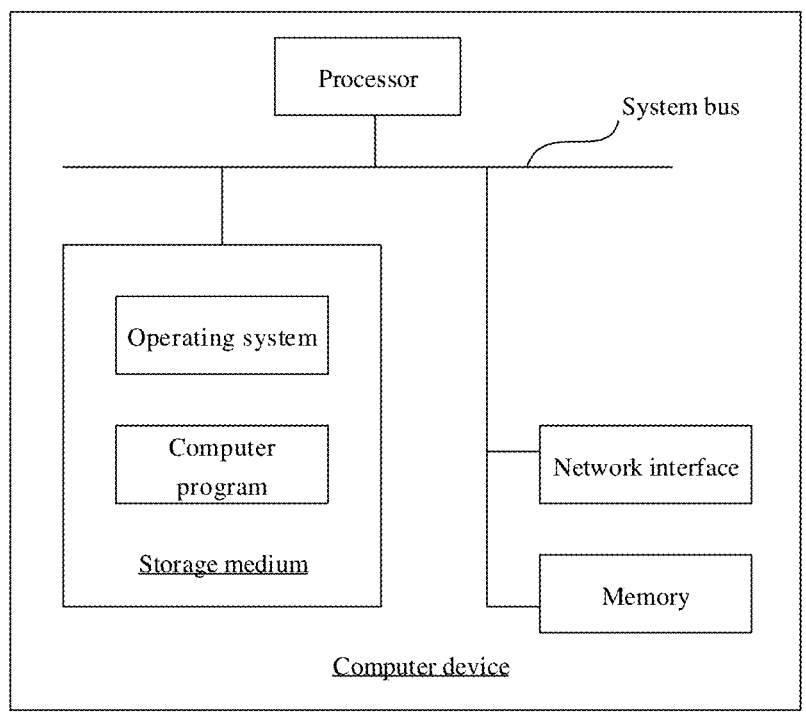
FIG. 7 is a structural block diagram of a computer device according to an embodiment of the present disclosure.

An embodiment of the present disclosure further provides a computer device. Referring to FIG. 7, FIG. 7 is a structural block diagram of the computer device according to an embodiment of the present disclosure.

As shown in FIG. 7, the computer device includes a processor, a non-volatile storage medium, a memory, and a network interface which are connected via a system bus. The non-volatile storage medium of the computer device stores an operating system, a database, and a computer-readable instruction. The database may store a control information sequence. When the computer-readable instruction is executed by the processor, the processor is enabled to perform the following steps:

acquiring a foreground pixel value and a background pixel value, where the foreground pixel value and the background pixel value are configured to separate a target area from an original image;

acquiring a foreground geodesic distance and a background geodesic distance, where the foreground geodesic distance is a distance between a pixel value of each of pixel points and the foreground pixel value in the original image, and the background geodesic distance is a distance between a pixel value of each of the pixel points and the background pixel value;

determining a transparency based on the foreground geodesic distance and the background geodesic distance; and separating the target area based on the transparency.

In some embodiments, the computer-readable instruction, when run by the processor, enables the processor to further perform the following steps:

acquiring a pixel distance between every two adjacent pixel points in the original image; and determining the foreground geodesic distance and the background geodesic distance based on the pixel distance between the two adjacent pixel points.

In some embodiments, the computer-readable instruction, when run by the processor, enables the processor to further perform the following step:

determining a foreground probability and a background probability of the pixel point based on the foreground geodesic distance and the background geodesic distance; and the computer-readable instruction, when run by the processor, enables the processor to further perform the following step:

determining the transparency based on the foreground geodesic distance, the background geodesic distance, the foreground probability and the background probability.

In some embodiments, the computer-readable instruction, when run by the processor, enables the processor to further perform the following steps:

acquiring the target area, where the target area is an area whose transparency is determined to be non-transparent;

adding the target area to a target background image; and storing the image added with the target area.

In some embodiments, the transparency is acquired by using the following formula:

$$\text{alpha} = DF * DF / (DB * DB + DF * DF);$$

where alpha denotes the transparency, the transparency is used for denoting whether a corresponding pixel point belongs to the target area, DF denotes the foreground geodesic distance, and DB denotes the background geodesic distance.

In some embodiments, the background probability is acquired by using the following formula:

$$PB = DF / (DF + DB);$$

where PB denotes the background probability, the background probability is used for representing a probability that the pixel point does not belong to the target area, DF denotes the foreground geodesic distance, and DB denotes the background geodesic distance.

In some embodiments, the foreground probability is acquired by using the following formula:

$$PF = DB / (DF + DB);$$

where PF denotes the foreground probability, the foreground probability is used for representing a probability that the pixel point belongs to the target area, DF denotes the foreground geodesic distance, and DB denotes the background geodesic distance.

In some embodiments, the computer-readable instruction, when run by the processor, enables the processor to further perform the following steps:

storing a foreground pixel point in a set;

storing a distance between each of the pixel points and the foreground pixel point in the original image in an array, where a distance between a pixel point that is not adjacent to the foreground pixel point and the foreground pixel point is infinity, and a distance between one foreground pixel point and another one is 0;

selecting a minimum distance from the array, and adding a pixel point corresponding to the minimum distance to the set;

replacing a second distance with a first distance in the array if the first distance is less than the second distance, where the first distance is a distance from the foreground pixel point to another pixel point via the newly added pixel point, and the second distance is a distance directly from the foreground pixel point to the another pixel point;

continuing to select a minimum distance other than the minimum distance from the array, to update a distance of a pixel point corresponding to the newly selected minimum distance in the array, until the set includes all pixel points in the original image; and determining the foreground geodesic distance between a pixel value of any pixel point and the foreground pixel value based on a distance corresponding to the any pixel point in the array.

In some embodiments, the computer-readable instruction, when run by the processor, enables the processor to further perform the following steps:

determining foreground pixel points in the pixel points, where the foreground pixel points are pixel points whose transparency is determined to be non-transparent; and separating the target area from the original image, where the target area is an area formed by the foreground pixel points.

In some embodiments, the transparency is acquired by using the following formula:

$$\text{alpha}=DB^{-r}*PB/(DF^{-r}*PF+DB^{-r}*PB);$$

where alpha denotes the transparency, the transparency is used for denoting whether a corresponding pixel point belongs to the target area, DF denotes the foreground geodesic distance, DB denotes the background geodesic distance, PF denotes the foreground probability and the foreground probability represents a probability that the pixel point belongs to the target area, PB denotes the background probability and the background probability is used for representing a probability that the pixel point does not belong to the target area, and r denotes a constant value.

The processor of the computer device is configured to provide calculation and control capabilities, and support the operations of the entire computer device. The memory of the computer device may store a computer-readable instruction. When the computer-readable instruction is executed by the processor, the processor is enabled to perform a method for separating an image. The network interface of the computer device is configured to connect and communicate with a terminal. A person skilled in the art can understand that the structure shown in FIG. 7 is only schematically a part of the structures related to the solution of the present disclosure, but is not intended to limit the computer device to which the solution of the present disclosure is applied. In some embodiments, the computer device includes more or fewer components than those illustrated in the drawings, or combine certain components, or have different component arrangements.

In the embodiment, the processor is configured to implement the specific functions of the acquiring module 2100, the processing module 2200, and the executing module 2300 in FIG. 6. The memory stores various data and program codes required for implementing the above modules. The network interface is configured to transmit data to a user terminal or a server. In the embodiment, the memory stores the program codes and data required for implementing all the sub-modules in a face image key point detection apparatus. The server can call the program codes and data of the server to implement the functions of all the sub-modules.

In the foregoing embodiment, a transparency of a pixel point at any edge position in a target area can be determined, so that the extraction of the contour of the target area is more accurate, and therefore the contour of the extracted target area can be natural without stiffness.

The present disclosure further provides a computer-readable storage medium storing an image separation program therein. The image separation program, when run by a processor, enables the processor to perform the following steps:

acquiring a foreground pixel value and a background pixel value, wherein the foreground pixel value and the background pixel value are configured to separate a target area from an original image;

acquiring a foreground geodesic distance and a background geodesic distance, wherein the foreground geodesic distance is a distance between a pixel value of each of pixel points and the foreground pixel value in the original image, and the background geodesic distance is a distance between a pixel value of each of the pixel points and the background pixel value;

determining a transparency based on the foreground geodesic distance and the background geodesic distance; and separating the target area based on the transparency.

In some embodiments, the image separation program, when run by the processor, enables the processor to perform the following steps:

acquiring a pixel distance between every two adjacent pixel points in the original image; and determining the foreground geodesic distance and the background geodesic distance based on the pixel distance between the two adjacent pixel points.

In some embodiments, the image separation program, when run by the processor, enables the processor to further perform the following steps:

determining a foreground probability and a background probability of the pixel point based on the foreground geodesic distance and the background geodesic distance; and the image separation program, when run by a processor, enables the processor to perform the following step:

determining the transparency based on the foreground geodesic distance, the background geodesic distance, the foreground probability and the background probability.

In some embodiments, the image separation program, when run by the processor, enables the processor to perform the following steps:

acquiring the target area, wherein the target area is an area whose transparency is determined to be non-transparent;

adding the target area to a target background image; and storing the image added with the target area.

In some embodiments, the transparency is acquired by using the following formula:

$$\text{alpha}=DF*DF/(DB*DB+DF*DF);$$

wherein alpha denotes the transparency, the transparency is used for denoting whether a corresponding pixel point belongs to the target area, DF denotes the foreground geodesic distance, and DB denotes the background geodesic distance.

In some embodiments, the background probability is acquired by using the following formula:

$$PB=DF/(DF+DB);$$

where PB denotes the background probability, the background probability is used for representing a probability that the pixel point does not belong to the target area, DF denotes the foreground geodesic distance, and DB denotes the background geodesic distance.

In some embodiments, the foreground probability is acquired by using the following formula:

$$PF=DB/(DF+DB);$$

where PF denotes the foreground probability, the foreground probability represents a probability that the pixel point belongs to the target area, DF denotes the foreground geodesic distance, and DB denotes the background geodesic distance.

In some embodiments, the image separation program, when run by the processor, enables the processor to further perform the following steps:

storing a foreground pixel point in a set;

storing a distance between each of the pixel points and the foreground pixel point in the original image in an array, where a distance between a pixel point that is not adjacent to the foreground pixel point and the foreground pixel point is infinity, and a distance between one foreground pixel point and another one is 0;

selecting a minimum distance from the array, and adding a pixel point corresponding to the minimum distance to the set;

replacing a second distance with a first distance in the array if the first distance is less than the second distance, where the first distance is a distance from the foreground pixel point to another pixel point via the newly added pixel point, and the second distance is a distance directly from the foreground pixel point to the another pixel point;

continuing to select a minimum distance other than the minimum distance from the array, to update a distance of a pixel point corresponding to the newly selected minimum distance in the array, until the set includes all pixel points in the original image; and determining the foreground geodesic distance between a pixel value of any pixel point and the foreground pixel value based on a distance corresponding to the any pixel point in the array.

In some embodiments, the image separation program, when run by the processor, enables the processor to further perform the following steps:

determining foreground pixel points in the pixel points, where the foreground pixel points are pixel points whose transparency is determined to be non-transparent; and separating the target area from the original image, where the target area is an area formed by the foreground pixel points.

In some embodiments, the transparency is acquired by using the following formula:

$$alpha=DB^{-r}*PB/(DF^{-r}*PF+DB^{-r}*PB);$$

where alpha denotes the transparency, the transparency is used for denoting whether a corresponding pixel point belongs to the target area, DF denotes the foreground geodesic distance, DB denotes the background geodesic distance, PF denotes the foreground probability and the foreground probability represents a probability that the pixel point belongs to the target area, PB denotes the background probability and the background probability is used for representing a probability that the pixel point does not belong to the target area, and r denotes a constant value.

The present disclosure further provides a computer program product. The computer program product includes a computer program. The computer program includes a program instruction, and is stored in a computer-readable storage medium. The program instruction, when executed by a processor, enables the processor to perform the following steps:

acquiring a foreground pixel value and a background pixel value, where the foreground pixel value and the background pixel value are configured to separate a target area from an original image;

acquiring a foreground geodesic distance and a background geodesic distance, where the foreground geodesic distance is a distance between a pixel value of each of pixel points and the foreground pixel value in the original image, and the background geodesic distance is a distance between a pixel value of each of the pixel points and the background pixel value;

determining a transparency based on the foreground geodesic distance and the background geodesic distance; and separating the target area based on the transparency.

In some embodiments, the program instruction, when executed by the processor, enables the processor to further perform the following steps:

acquiring a pixel distance between every two adjacent pixel points in the original image; and determining the foreground geodesic distance and the background geodesic distance based on the pixel distance between the two adjacent pixel points.

In some embodiments, the program instruction, when executed by the processor, enables the processor to further perform the following step:

determining a foreground probability and a background probability of the pixel point based on the foreground geodesic distance and the background geodesic distance; and the program instruction, when executed by the processor, enables the processor to further perform the following step:

determining the transparency based on the foreground geodesic distance, the background geodesic distance, the foreground probability and the background probability.

In some embodiments, the program instruction, when executed by the processor, enables the processor to further perform the following steps:

acquiring the target area, where the target area is an area whose transparency is determined to be non-transparent;

adding the target area to a target background image; and storing the image added with the target area.

In some embodiments, the transparency is acquired by using the following formula:

$$alpha=DF*DF/(DB*DB+DF*DF);$$

where alpha denotes the transparency, the transparency is used for denoting whether a corresponding pixel point belongs to the target area, DF denotes the foreground geodesic distance, and DB denotes the background geodesic distance.

In some embodiments, the background probability is acquired by using the following formula:

$$PB=DF/(DF+DB);$$

where PB denotes the background probability, the background probability is used for representing a probability that the pixel point does not belong to the target area, DF denotes the foreground geodesic distance, and DB denotes the background geodesic distance.

In some embodiments, the foreground probability is acquired by using the following formula:

$$PF=DB/(DF+DB);$$

where PF denotes the foreground probability, the foreground probability represents a probability that the pixel point belongs to the target area, DF denotes the foreground geodesic distance, and DB denotes the background geodesic distance.

In some embodiments, the program instruction, when executed by the processor, enables the processor to further perform the following steps:

storing a foreground pixel point in a set;

storing a distance between each of the pixel points and the foreground pixel point in the original image in an array, where a distance between a pixel point that is not adjacent to the foreground pixel point and the foreground pixel point is infinity, and a distance between one foreground pixel point and another one is 0;

selecting a minimum distance from the array, and adding a pixel point corresponding to the minimum distance to the set;

replacing a second distance with a first distance in the array if the first distance is less than the second distance, where the first distance is a distance from the foreground pixel point to another pixel point via the newly added pixel point, and the second distance is a distance directly from the foreground pixel point to the another pixel point;

continuing to select a minimum distance other than the minimum distance from the array, to update a distance of a pixel point corresponding to the newly selected minimum distance in the array, until the set includes all pixel points in the original image; and determining the foreground geodesic distance between a pixel value of any pixel point and the foreground pixel value based on a distance corresponding to the any pixel point in the array.

In some embodiments, the program instruction, when executed by the processor, enables the processor to further perform the following steps:

determining foreground pixel points in the pixel points, where the foreground pixel points are pixel points whose transparency is determined to be non-transparent; and separating the target area from the original image, where the target area is an area formed by the foreground pixel points.

In some embodiments, the transparency is acquired by using the following formula:

$$alpha = DB^{-r} * PB / (DF^{-r} * PF + DB^{-r} * PB);$$

where alpha denotes the transparency, the transparency is used for denoting whether a corresponding pixel point belongs to the target area, DF denotes the foreground geodesic distance, DB denotes the background geodesic distance, PF denotes the foreground probability and the foreground probability represents a probability that the pixel point belongs to the target area, PB denotes the background probability and the background probability is used for representing a probability that the pixel point does not belong to the target area, and r denotes a constant value A person skilled in the art may understand that the whole or a part of the steps for performing the method in the above embodiments can be completed by instructing relevant hardware via a computer program. The computer program may be stored in a computer-readable storage medium. When the program is run, the steps of the method in the above embodiments are performed. The storage medium may be a magnetic disk, a compact disk, a read-only memory (ROM) and other non-volatile storage mediums, or a random access memory (RAM), or the like.

It should be understood that although the steps in the flowcharts of the drawings are sequentially displayed according to arrows, the steps are not necessarily sequentially performed in orders indicated by the arrows. Unless explicitly stated in the text, the sequence of performing the steps is not limited, and the steps may also be performed in other orders. Moreover, at least a part of the steps in the flowcharts of the drawings may include a plurality of sub-steps or a plurality of stages; the sub-steps or stages are not necessarily performed at the same time, but may also be performed at different times; and the sub-steps or stages are not necessarily performed sequentially, but may also be performed in turn or alternately with other steps or at least a part of the sub-steps or stages of other steps.

What is claimed is:

1. A method for separating an image, comprising:

acquiring a foreground pixel value and a background pixel value, wherein the foreground pixel value and the background pixel value are configured to separate a target area from an original image;

acquiring a foreground geodesic distance and a background geodesic distance, wherein the foreground geodesic distance is a distance between a pixel value of each of pixel points and the foreground pixel value in the original image, and the background geodesic distance is a distance between a pixel value of each of the pixel points and the background pixel value;

determining a transparency based on the foreground geodesic distance and the background geodesic distance;

determining foreground pixel points in the pixel points, wherein the foreground pixel points are pixel points whose transparency is determined to be non-transparent; and separating the target area from the original image, wherein the target area is an area formed by the foreground pixel points.

2. The method according to claim 1, wherein said acquiring the foreground geodesic distance and the background geodesic distance comprises:

acquiring a pixel distance between every two adjacent pixel points in the original image; and determining the foreground geodesic distance and the background geodesic distance based on the pixel distance between every two adjacent pixel points.

3. The method according to claim 1, wherein said determining the transparency comprises:

determining a foreground probability and a background probability of the pixel points based on the foreground geodesic distance and the background geodesic distance; and determining the transparency based on the foreground geodesic distance, the background geodesic distance, the foreground probability and the background probability.

4. The method according to claim 1, further comprising:

acquiring the target area, wherein the target area is an area whose transparency is determined to be non-transparent;

adding the target area to a target background image; and storing the image added with the target area.

5. The method according to claim 1, wherein the transparency is determined by:

$$alpha = DF * DF / (DB * DB + DF * DF);$$

wherein alpha denotes the transparency, the transparency is used for denoting whether a corresponding pixel point belongs to the target area, DF denotes the foreground geodesic distance, and DB denotes the background geodesic distance.

6. The method according to claim 3, wherein the background probability is determined by:

$$PB=DF/(DF+DB);$$

wherein PB denotes the background probability, the background probability is used for representing a probability that the pixel point does not belong to the target area, DF denotes the foreground geodesic distance, and DB denotes the background geodesic distance.

7. The method for separating an image according to claim 3, wherein the foreground probability is determined by:

$$PF=DB/(DF+DB);$$

wherein PF denotes the foreground probability, the foreground probability represents a probability that the pixel point belongs to the target area, DF denotes the foreground geodesic distance, and DB denotes the background geodesic distance.

8. The method according to claim 1, wherein said acquiring the foreground geodesic distance and the background geodesic distance comprises:
    storing a foreground pixel point in a set;
    storing a distance between the each of the pixel points and the foreground pixel point in the original image in an array, wherein a distance between a pixel point that is not adjacent to the foreground pixel point and the foreground pixel point is infinity, and a distance between one foreground pixel point and another one is 0;
    selecting a minimum distance from the array, and adding a pixel point corresponding to the minimum distance to the set;
    replacing a second distance with a first distance in the array in response to the first distance is less than the second distance, wherein the first distance is a distance from the foreground pixel point to another pixel point via a newly added pixel point, and the second distance is a distance directly from the foreground pixel point to the another pixel point;
    continuing to select a minimum distance other than the minimum distance from the array, to update a distance of a pixel point corresponding to a newly selected minimum distance in the array, until the set comprises all of the pixel points in the original image; and
    determining the foreground geodesic distance between a pixel value of any pixel point and the foreground pixel value based on a distance corresponding to the any pixel point in the array.

9. The method according to claim 3, wherein the transparency is detemined by:

$$alpha=DB^{-r}*PB/(DF^{-r}*PF+DB^{-r}*PB);$$

wherein alpha denotes the transparency, the transparency is used for denoting whether a corresponding pixel point belongs to the target area, DF denotes the foreground geodesic distance, DB denotes the background geodesic distance, PF denotes the foreground probability, the foreground probability represents a probability that the pixel point belongs to the target area, PB denotes the background probability, the background probability is used for representing a probability that the pixel point does not belong to the target area, and r denotes a constant value.

10. A computer device, comprising:
    a memory storing computer-readable instruction; and a processor, wherein the computer-readable instruction, when executed by the processor, enables the processor to perform a method comprising:
    acquiring a foreground pixel value and a background pixel value, wherein the foreground pixel value and the background pixel value are configured to separate a target area from an original image;
    acquiring a foreground geodesic distance and a background geodesic distance, wherein the foreground geodesic distance is a distance between a pixel value of each of pixel points and the foreground pixel value in the original image, and the background geodesic distance is a distance between a pixel value of each of the pixel points and the background pixel value;
    determining a transparency based on the foreground geodesic distance and the background geodesic distance;
    determining foreground pixel points in the pixel points, wherein the foreground pixel points are pixel points whose transparency is determined to be non-transparent; and
    separating the target area from the original image, wherein the target area is an area formed by the foreground pixel points.

11. The computer device according to claim 10, wherein the method further comprises:
    acquiring a pixel distance between every two adjacent pixel points in the original image; and
    determining the foreground geodesic distance and the background geodesic distance based on the pixel distance between every two adjacent pixel points.

12. The computer device according to claim 10, wherein the method further comprises:
    determining a foreground probability and a background probability of the pixel points based on the foreground geodesic distance and the background geodesic distance; and
    determining the transparency based on the foreground geodesic distance, the background geodesic distance, the foreground probability and the background probability.

13. The computer device according to claim 10, wherein the method further comprises:
    acquiring the target area, wherein the target area is an area whose transparency is determined to be non-transparent;
    adding the target area to a target background image; and
    storing the image added with the target area.

14. The computer device according to claim 10, wherein the transparency is determined by:

$$alpha=DF*DF/(DB*DB+DF*DF);$$

wherein alpha denotes the transparency, the transparency is used for denoting whether a corresponding pixel point belongs to the target area, DF denotes the foreground geodesic distance, and DB denotes the background geodesic distance.

15. The computer device according to claim 12, wherein the background probability is determined by:

$$PB=DF/(DF+DB);$$

wherein PB denotes the background probability, the background probability is used for representing a probability that the pixel point does not belong to the target area, DF denotes the foreground geodesic distance, and DB denotes the background geodesic distance.

16. The computer device according to claim 12, wherein the foreground probability is determined by:

$PF=DB/(DF+DB)$;

wherein PF denotes the foreground probability, the foreground probability represents a probability that the pixel point belongs to the target area, DF denotes the foreground geodesic distance, and DB denotes the background geodesic distance.

17. The computer device according to claim 10, wherein the transparency is determined by:

$alpha=DB^{-r}*PB/(DF^{-r}*PF+DB^{-r}*PB)$ wherein alpha denotes the transparency, the transparency is used for denoting whether a corresponding pixel point belongs to the target area, DF denotes the foreground geodesic distance, DB denotes the background geodesic distance, PF denotes the foreground probability, the foreground probability represents a probability that the pixel point belongs to the target area, PB denotes the background probability, the background probability is used for representing a probability that the pixel point does not belong to the target area, and r denotes a constant value.

18. A computer-readable storage medium storing an image separation program therein, wherein the image separation program, when run by a processor, enables the processor to perform the following steps:

acquiring a foreground pixel value and a background pixel value, wherein the foreground pixel value and the background pixel value are configured to separate a target area from an original image;

acquiring a foreground geodesic distance and a background geodesic distance, wherein the foreground geodesic distance is a distance between a pixel value of each of pixel points and the foreground pixel value in the original image, and the background geodesic distance is a distance between a pixel value of each of the pixel points and the background pixel value;

determining a transparency based on the foreground geodesic distance and the background geodesic distance;

determining foreground pixel points in the pixel points, wherein the foreground pixel points are pixel points whose transparency is determined to be non-transparent; and separating the target area from the original image, wherein the target area is an area formed by the foreground pixel points.

* * * * *